United States Patent
Craven et al.

(10) Patent No.: US 7,069,689 B2
(45) Date of Patent: Jul. 4, 2006

(54) METHOD AND SYSTEM FOR REGULATING PLANT GROWTH

(76) Inventors: John P. Craven, 4921 Waa St., Honolulu, HI (US) 96821; Jack Davidson, 2433 Greensboro Rd., Pacerville, CA (US) 95667; Richard Bailey, 73-1679 Kao St., Kailua-Kona, HI (US) 96740

( * ) Notice: Subject to any disclaimer, the term of this patent is extended or adjusted under 35 U.S.C. 154(b) by 55 days.

(21) Appl. No.: 10/379,912

(22) Filed: Mar. 6, 2003

(65) Prior Publication Data

US 2003/0217508 A1 Nov. 27, 2003

Related U.S. Application Data

(60) Provisional application No. 60/361,726, filed on Mar. 6, 2002.

(51) Int. Cl.
*A01B 79/02* (2006.01)
(52) U.S. Cl. .................................................. 47/58.1 R
(58) Field of Classification Search ................ 47/19.1, 47/19.2, 18, 88, 1.01 R, 2, 58.1 R
See application file for complete search history.

(56) References Cited

U.S. PATENT DOCUMENTS

| | | | | |
|---|---|---|---|---|
| 1,967,803 A | * | 7/1934 | Boland | 405/40 |
| 2,350,621 A | * | 6/1944 | Kasser | 47/2 |
| 4,348,135 A | * | 9/1982 | St. Clair | 405/36 |
| 4,437,263 A | * | 3/1984 | Nir et al. | 47/1.01 R |
| 5,009,029 A | * | 4/1991 | Wittlin | 47/62 C |
| 6,138,403 A | * | 10/2000 | Bartlett, Jr. | 47/18 |
| 2003/0217508 A1 | * | 11/2003 | Craven et al. | 47/58.1 R |

FOREIGN PATENT DOCUMENTS

| | | | | |
|---|---|---|---|---|
| CH | SU 676227 A | * | 8/1979 | |
| CH | SU 1115681 A | * | 9/1984 | |
| JP | 401171415 A | * | 7/1989 | |
| JP | 405207823 A | * | 8/1993 | |
| JP | 410098948 A | * | 4/1998 | |
| JP | 411253059 A | * | 9/1999 | |
| JP | 02002330641 A | * | 11/2002 | |
| JP | 02003000071 A | * | 1/2003 | |
| KR | 2003049999 A | * | 6/2003 | |
| RU | 2110171 C | * | 5/1998 | |

OTHER PUBLICATIONS

Hawaii OTEC Fact Sheet: http://www.hawaii.gov/dbedt/ert/otec_hi.html; last modified Apr. 22, 2005.*

* cited by examiner

*Primary Examiner*—Francis T. Palo
(74) *Attorney, Agent, or Firm*—Kramer & Amado, P.C.

(57) ABSTRACT

A system and method for regulating plant growth according to the creation of temperature gradients within the vegetative portion of a plant and its roots or rhizomes. A system of pipes or conduits capable of thermally manipulating their surrounding environment is placed within proximity of roots or rhizomes to create a temperature differential across the selected plant species. Through temperature variations created by thermally conductive pipes or conduits, plant growth can be regulated.

16 Claims, No Drawings

METHOD AND SYSTEM FOR REGULATING PLANT GROWTH

FIELD OF THE INVENTION

The present invention relates to the growth of plants in general and specifically relates to the regulation of plant growth through the creation of temperature gradients between plant roots or rhizomes and the vegetative portion of the plant, such as the stalk, stems, leaves, fruits and flowers.

BACKGROUND OF THE INVENTION

Plant growth is a field that has been utilized and manipulated since the beginning of time. Regulation of water flow patterns, namely the use of irrigation, allowed for the growth of crops in many regions of the world with greater efficiency and yield. With increasing worldwide populations, current agricultural lands will soon become inadequate in production of the crops necessary for an increasing population. In an effort to produce better nutrition with current agricultural lands, genetic engineering is being used to increase crop quality as well as yields. Even with these advancements, alternative lands and growing methods will be necessary to produce the crops necessary for a growing population.

Plants not used for food but for other purposes, such as for decoration, covering for sports fields and used to stabilize soil susceptible to erosion also suffer from their ability to only grow within prescribed environments, based on soil types, growing seasons, temperature, humidity and other environmental and ecological factors. The ability to grow grasses and other soil covering plants in non-indigenous environments would be beneficial for the establishment and maintenance of fields used for sporting events, landscaping and stabilization of land in areas susceptible to erosion of the topsoil. Based on these needs, there exists the need to develop systems and methods that are useful for the regulation of plant growth in a variety of environments.

SUMMARY OF THE INVENTION

The present invention is directed towards a method and a corresponding system for regulating plant growth in a variety of environments. The method and system are based upon a concept that plant growth can be regulated, initiated, increased and sustained by placing a source of temperature regulation in the vicinity of plant roots or rhizomes while exposing the vegetative portion, such as the stalk, stems, leaves, fruits and flowers, to sunlight. This is due to the fact that the growth and productivity of a plant is affected by the difference in temperature between the root or rhizomes and the vegetative portion of a particular plant. This method and system are useful to initiate plant growth in regions that otherwise would not be able to sustain plant growth. Additionally, the phenomenon may be used to strengthen the roots of newly grown or existing plant life by maintaining the temperature difference between the surface of the soil and a depth beneath the surface of the soil.

Specifically, a method of regulating plant growth is disclosed, which includes the steps of selecting a root or rhizome containing plant, placing a source of temperature regulation a predetermined distance from the roots or rhizomes, and regulating plant growth according to the temperature regulation.

The system and method that uses the aforementioned thermodynamic phenomenon to create plant growth will be explained below.

DETAILED DESCRIPTION OF THE INVENTION

The system and method of the present invention is realized when a temperature gradient is produced between the vegetative portion of a vascular plant, defined as the stalk, stems, leaves, fruits and flowers, which are disposed on the surface of the soil, and the roots and/or rhizomes of the plant below the surface. When an area exists below the surface that has a cooler temperature than the surface of the soil substrate, defined as a bed of growth material of either natural or synthetic origin, and the soil surface maintains a temperature that is below the dew point, water condenses on the surface and is carried by gravity into the porous soil. As the water travels, it naturally becomes denser, due to the change in temperature, and continues traveling to the coldest area below the soil. As the dense water flows, it picks up nutrients in the soil, which are transported along with the water to this area having the cooler temperature.

Specifically, the present invention utilizes this thermodynamic effect to create a thermally regulated agricultural system. One embodiment of the present invention utilizes a system of pipes or conduits that extend parallel to and at a predetermined distance under the surface of the soil. Thermally conductive, non-rigid conduits capable of transporting liquid, or generating the necessary temperatures without a liquid may also be used as long as they can conduct the thermal energy from the interior of the conduit to the surrounding environment. To create an area under the soil that has a cooler temperature than the surface of the soil, one embodiment uses pipes or conduits to transfer a liquid, such as cold seawater that is obtained from the ocean. As the cold liquid travels through the pipes or conduits, a pattern of isotherms is created which determines the moisture content of the soil adjacent the pipes or conduits due to the gradient crated. The pipes of conduits may consist of any type of material capable of conducting thermal energy outwardly towards the surrounding area. These materials include polymers, such as plastics and metals or non-corrodible metals, such as stainless steel. Depending upon the type of soil utilized, the temperature of the pipes or conduits, and the distance the pipes are disposed from the soil surface, the temperature and moisture content of the soil may be manipulated to produce a desired result.

Many different plant and plant applications may be developed through the utilization of the present invention. A variety of vascular plants, such as grasses and other various species of plants, may be grown and sustained using the system and method of the present invention. For example, grass turf may be produced by planting seeds or by the transfer of conventional turf to a soil bed, which contains the minerals, nutrients or fertilizer required for plant growth. The system of plastic, metal or non-corrodible metal pipes or conduits may be embedded in the soil at a specific depth that depends upon the type of grass or plant to be grown.

In one embodiment of the present invention, a liquid, such as cold water from the deep ocean, usually from a depth of 2000 feet or more for example, may be circulated through the pipes. The water may have a temperature of between 4 and 6 degrees Centigrade (40–43 degrees F.). The process may work for cold water as warm as 14 degrees Centigrade (57 degrees F.). Alternatively, the system may also be used to transport warmer water to delay, halt or induce plant dormancy. The pipes may be laid in parallel although, depending upon the environment and the specific plant or variety of plants to be grown, a plurality of configurations may be utilized. The pattern of isotherms created by the liquid traveling through the pipes will be realized in an area having a temperature that is cooler than the temperature at the surface of the soil, the surface having a temperature that is preferably below the dew point.

As a result, water will condense on the surface and be carried by gravity into the porous soil. As the water travels along flow lines orthogonal to the isotherms, the water will become denser and pick up nutrients disposed in the soil along the way. As a result of the downward direction of motion, the nutrients will be transported to the roots of the plants disposed on the surface of the soil. The condensed water will continue to gravitate towards the coldest spot, which will be formed in the area adjacent the cold water pipes. As a result of the gravitation of the nutrient enriched water, the roots of the plants will extend to the nutrient enriched areas of the soil bed, which are now formed in the area around the cold water pipes. Therefore, plant and root growth and maintenance will be sustained due to the system and method of the present invention. Furthermore, the roots of the grasses and plants will be strengthened allowing for the plant to withstand greater wear and tear on the surface without being forced from the soil.

In one embodiment of the present invention a layer of sand containing nutrients was placed directly under a specific type of grass to be grown. A second layer of chic soil was placed underneath the sand layer, and the cold water pipes were disposed in a parallel configuration in the chic soil layer. Many nutrient rich soil layers and different combinations of soil layer configurations may be utilized to stimulate plant growth in this fashion.

The system and method of the present invention may be utilized in a variety of applications. One application envisioned is the strengthening of grass and turf systems that sustain heavy traffic, damage, and use during a period of activity thereon. Examples of this are grasses and turfs disposed on soccer fields, golf courses, recreational parks, as well as grasses and turfs that are disposed in areas wherein the soil does not sufficiently maintain plant growth in an optimum environment. Some examples of these areas include tropical islands, where the soil is very rocky or made of volcanic ash, and water deprived areas such as deserts and dry coastal areas. In this application, the system and method of the present invention may be used to strengthen the roots of the various plants and grasses such that the plant life may be sustained in that particular environment. The depth of the cold water pipes may be used to produce the desired depth of the roots.

Some examples of grasses and turfs that have been grown utilizing this system are the bent grass family, the tall grass family, the tall fescue family, the rye family, seashore paspullum, tiff green, and St. Augustine. A variety of fruits, vegetables, and plants may also be grown utilizing this system and method.

Furthermore, optimal growing conditions may be obtained for a variety of plants including grasses, turfs, fruits, and vegetables, depending upon the configurations of the specific parameters of the system and method of the present invention. Different species of plants may require a particular depth at which the thermal source is disposed, specific combinations of layers and types of soil, a specific temperature gradient between the surface soil and the pipes, a pipe or conduit having specific dimensions, characteristics, and features, a specific temperature of the water running through the pipes or conduits, a specific number of pipes or conduits, and a specific configuration of the pipes or conduits disposed in the soil. Additionally, the depths of the soil and/or soil layers may be manipulated in an effort to grow specific types of plants, grasses and turfs in specific types of environments and conditions.

Another embodiment of the present invention may be used for the periodic release of surface nutrients to the root tips of various plants. In this configuration, the system and method of the present invention may be supplied via pipes or conduits to an area underneath a soil bed that has specific layers of soil, disposed over and adjacent the pipes or conduits, that comprise fertilizer, nutrients, minerals, and the like. At specific points in the growing season, cold water may be allowed to flow through the pipes to create a temperature gradient in the soil. The controlled flow of the water in this system may create a nutrient delivery system in the same manner described above.

The type of soil used, the specific layers of soil used, and the configuration of those layers used to grow the plants and grasses, may determine the amount of growth sustained by the plants and grasses. The inventor has tested over 300 species of vegetation using the present invention. Below are examples of some of the species that have been regulated, manipulated or enhanced by the present invention.

EXAMPLE 1

Strawberries (Genus *Fragaria*), which represent a seasonal variety normally grown in temperate regions was grown in the tropical climate of the island of Hawaii.

Test Plot 80 strawberry plants were planted at 12" by 12" spacing on a plot measuring 80 ft.$^2$ with a system of underground pipes installed at a depth of 4" and spaced at 6". Cold liquid was introduced into the underground pipes so as to maintain an average soil temperature at 4" depth of 9.8° C. The plants had an 82% survival rate with 76% of the plants bearing fruit over an 8-month period.

Control Plot 80 strawberry plants were planted at 12" by 12" spacing on a plot measuring 80 ft$^2$ without an underground system. Average soil temperature at 4" depth of 23.5° C. The plants had a 12% survival rate with 0% bearing fruit and showing wilt-heat stress throughout the experiment during an 8-month period.

EXAMPLE 2

Grapes of the *Isabella var* variety were grown to determine if the present invention could regulate control in flowering and fruiting as well as growth in grape plants. Bare root plants having already produced three crops of fruit prior to this experiment were transplanted into two lava pits on the island of Hawaii and dug to a depth of 3 feet. An underground system of pipes was installed in both pits and covered with a soil medium mixture to a depth of 1 meter. Bare root plants were planted at 1.5 meter spacing for a total of 6 plants per bed. The two identical beds, .identified as Grape vine row #1 and Grape vine row #2, measured 1.25 meters wide by 15 meters long by 1.25 meters deep each.

Experimental Plots

Grape vine row #1, Grape vine row #2, 6 plants with an underground system of pipes at 1 meter of depth, with water flowing through the system at a range of 4°–8° C. until both plants were ready for pruning. The source of cold water was turned off to Vine #2 prematurely during the cycle to place the vine out of phase with respect to vine #1, which was currently in early phase of ripening. Vine #1 was allowed to go through full fruit ripening before entering the experiment. The vines received overhead freshwater every three days to reduce salt build up on the leaf canopy during the experiment period (each vine approx 6 liters/3 days). Rainfall during the period was 3.7 cm. Average air temperature was a high of 28.6° C. and a low of 21.3° C.

Data Summary-Vine #2

| | |
|---|---|
| (Day 0) | Cold water source was turned off |
| (Day 0) | The vine plants were pruned using traditional pruning techniques |
| (Day 0) | Average Soil temperature 9.3° C. at 0.35 m depth. |
| (Day 0) | Average Soil temperature 26.5° C. at 0.35 m depth. |
| (Day 0) | DOW turned on |
| (Day 06) | Average Soil temperature 9.1° C. at 0.35 m depth. |
| (Day 09) | Leaf buds appear |
| (Day 18) | Grape flowers forming |
| (Day 18) | Average Soil temperature 9.3° C. at 0.35 m depth. |
| (Day 26) | Leaf canopy developing |
| (Day 32) | Grapes developing in size |
| (Day 62) | Cold water source system turned off with Grapes at mid maturity |
| (Day 62) | Average Soil temperature 9.4° C. at 0.35 m depth. |
| (Day 70) | Average Soil temperature 24.6° C. at 0.35 m depth. |
| (Day 73) | Grapes ripening and harvested |
| (Day 92) | Harvested final grapes (total harvest 23 pounds). |
| (Day 92) | Average Soil temperature 24.5° C. at 0.35 m depth |
| (Day 93) | Vines pruned. |
| (Day 110) | Cold water source turned on to repeat second cycle |

Data Summary-Vine #1

| | |
|---|---|
| (Day 0) | Cold water source turned off |
| (Day 0) | The vines plant were pruned using traditional pruning techniques |
| (Day 0) | Cold water source turned on |
| (Day 0) | Average soil temperature 26.8° C. at 0.35 m. |
| (Day 5) | Average Soil temperature 9.3° C. at 0.35 m depth |
| (Day 5) | Leaf buds appear. |
| (Day 20) | Grape flowers appear. |
| (Day 28) | Canopy developing |
| (Day 28) | Average Soil temperature 9.2° C. at 0.35 m depth. |
| (Day 32) | Grapes maturing |
| (Day 52) | Grapes at mid-maturity |
| (Day 60) | Grapes at ripening. |
| (Day 60) | Cold water source turned off |
| (Day 60) | Average Soil temperature 9.2° C. at 0.35 m depth. |
| (Day 68) | Average Soil temperature 25.5° C. at 0.35 m depth. |
| (Day 83) | Grapes maturing |
| (Day 97) | Grapes Harvested total weight 40 pounds. |
| (Day 97) | Average Soil temperature 25.7° C. at 0.35 m depth |
| (Day 99) | Vines pruned |
| (Day 109) | DOW turned on |

Results:

The grape vines continue to show 100–120 day cycles of production. Both vines continue to be out of production phase from each other. Vine #2 produced a 8.58 kg crop of grapes within 110 days while Vine #2 produced a 14.92 kg crop of grapes in 110 days. Average soil temperature was 9.25° C. during infusion of the cold water source while average soil temperature was 25.6° C. at ambient without the cold water source. The plants ability to reduce the growing season is an indication that this plant is able to gain additional nutrients from the soil from added energy received from the difference between the root zone temperature and leaf temperature. The plants ability to produce grape flowers prior to full leaf canopy suggests that the plant has gained enough energy from the thermal gradient, in addition to stored energy gained from photosynthesis, to produce flowers. Turning off the cold water source and warming of the soil at critical times during the ripening of the grapes is crucial to grape ripening. The simulation of autumn soil temperature has demonstrated the ability to change growth phases in plants and the ability to control sequential crop production annually in a tropical location. This experiment demonstrates the ability to produce temperate crops on a coastal desert thereby allowing for the regulation of plant growth using the present invention.

EXAMPLE 3

Broccoli (Genus *Brassica*) was grown on the island of Hawaii to determine if a temperate species could be grown in a tropical climate.

Test Plots

Three plots measuring 20.5 m$^2$ were planted with an underground network of pipes creating a source of soil cooling by use of cold water flowing through the pipe network. 64 two-week-old seedlings were planted at 0.45 meters distance apart per plot. Average soil temperature at 12.5 cm depth was maintained at 8.9° C. After 45 days, plant survival was 93.5%.

Control Plot

One plot measuring 20.5 m$^2$ was planted without an underground network of pipes. 64 two-week-old seedlings were planted at 0.45 meters distance. Average soil temperature at 12.5 cm depth was 27° C. After 45 days, plant survival was 32.3.%.

Results:

The experiment demonstrated that broccoli can be grown in a tropical climate based on regulation of soil temperature and plant survival can be greatly increased.

EXAMPLE 4

Carrots (*Daucus carota*) were grown on the island of Hawaii on 3 test plots having an underground soil cooling system while a control plot was grown without a soil cooling system to determine the effects of temperature regulation in an area proximate to a root on root length.

Test Plot

Three plots were established with a network of pipes for regulating soil temperature at a depth of 25 cm below the soil surface and water at a temperature between 4°–7° C. was transferred through the network of pipes. Groups of 3—3 carrot seeds were sowed in rows 1.5 cm deep by 1.5 cm apart in rows 12.5 cm apart. Carrots were thinned to one carrot every 4 cm at day 25 in each bed. Carrots were harvested at day 48 and had an average carrot length of 22.8 cm.

Control Plot

One plot, without a network of pipes for regulating soil temperature, was established. Groups of 3—3 carrot seeds were sowed in rows 1.5 cm deep by 1.5 cm apart in rows 12.5 cm apart. Carrots were thinned to one carrot every 4 cm at day 25 in each bed. The growth was carried out at ambient temperature without any cooling of the surrounding soil. Carrots were harvested at day 48 and had an average carrot length of 8.2 cm.

Results:

Carrots are a temperate species agricultural crop, which requires cool soil conditions. In addition to increased carrot length with the soil cooling system, the average carrot weight in the test plots was 78.9% greater than the control bed carrots and the number of harvested carrots was 83% greater in the test plots than in the control bed. A similar test was also performed with the network of pipes changed from a depth of 25 cm to 15 cm. The results were similar but with the carrot crop growing shorter but wider and of increased weight, demonstrating root growth towards the systems coldest point.

EXAMPLE 5

Potatoes (Genus *Solanum*) were grown on 4 plots, three having soil temperature regulation while a fourth was at ambient temperature to determine the role of multiple temperatures on growth. An equal number of seed potatoes were planted in each plot Test Plot #1

A plot measuring 4.4 m$^2$ was planted with an underground network of pipes and the soil was kept at 8.9° C.

Test Plot #2

A plot measuring 4.4 m$^2$ was planted with an underground network of pipes and the soil was kept at 11.2° C.

Test Plot #3

A plot measuring 4.4 m$^2$ was planted with an underground network of pipes and the soil was kept at 22.3° C.

Control Plot

A plot measuring 4.4 m$^2$ was planted without an underground network of pipes and the soil average ambient temperature was 25.2° C.

Results:

Potatoes from all 4 plots were harvested at day 65. The control plot did not produce any potatoes while the number of potatoes per plot increased from plot #3 to plot #1. The experiment demonstrated that the greater the temperature gradient ($\Delta T$) between the soil surrounding the roots and the vegetative portion of the plant the better the growth of the crop.

EXAMPLE 6

Bent grass (*Agrostis palustis*) is a temperate region grass used for golf courses in North America but does not respond well to growth in tropical regions, where it wilts and suffers from heat stress.

Test Plot

Two plots of 21 m$^2$ were constructed with an underground cooling network of pipes at a depth of 20.5 cm. Bent grass seed was planted and overhead irrigation was provided for germination. After germination and plant leaf size reached 3 cm, supplemental irrigation was reduced by 95%. Root measurements averaged 17.5 cm in length and the average root zone temperature was 10° C.

Control Plot

A plot measuring 21 m$^2$ was constructed without an underground cooling network of pipes. Bent grass seed was planted and overhead irrigation was provided for germination. After germination and plant leaf size reached 3 cm, supplemental irrigation was reduced by 95%. Bent grass growth was minimal at ambient temperature.

Results:

Best grass grew with minimal overhead irrigation in the test plot showing that a temperate grass may be used in tropical climates with the use of the system and method of the present invention.

EXAMPLE 7

Lettuce (Genus *Asteraceae*) was grown in test and control plots to determine whether a short season shallow root temperate crop could be grown in the tropical climate of the island of Hawaii.

Test Plots

Nine-day-old lettuce starts were transplanted into two plots with an underground network of pipes at a depth of 5 cm and measuring 20.5 m$^2$ per plot. The lettuce starts were planted 6 cm apart in 15 cm wide rows. Soil temperature was regulated and averaged 8.5° C. at a depth of 5 cm. Overhead irrigation was provided.

Control Plot

Nine-day-old lettuce starts were transplanted into two plots without an underground network of pipes, the control plot measuring 20.5 m$^2$. The lettuce starts were planted 6 cm apart in 15 cm wide rows. Soil temperature was not regulated and averaged the resultant temperature based on the ambient temperature. Overhead irrigation was provided equally to the control and test plots.

Results:

Lettuce was harvested 12 days from transplant. Lettuce heads were of excellent quality while lettuce in the control bed had serious wilt stress and low survival at 22% after transplant and developed "bolts" or flowers which turn the plant leaves bitter and tough. Lettuce in the test plots had a survival rare of 88% while also demonstrating a lettuce crop in 20% less time that with typical agricultural techniques. The experiment was useful in showing the utility of the present invention with shallow root crops.

Although the present invention has been described in detail with particular reference to preferred embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure and description are for illustrative purposes only, and do not in any way limit the invention, which is defined only by the claims.

What is claimed is:

1. A method of regulating plant growth, comprising the steps of:
   selecting a root or rhizome containing plant, wherein the roots or rhizomes of the plant are planted in a growing medium;
   placing a source of deep ocean water in the growing medium of the roots or rhizomes at a predetermined distance from the roots or rhizomes; and
   regulating plant growth, comprising lowering the temperature of the growing medium at the source of deep ocean water.

2. The method of claim 1, wherein the root or rhizome containing plant is a vascular plant.

3. The method of claim 1, wherein the source of deep ocean water is a pipe.

4. The method of claim 3, wherein the pipes are of a non-corrodible metal.

5. The method of claim 3, wherein the pipes are non-metallic.

6. The method of claim 1, wherein the placement of the deep ocean water source a predetermined distance is within a range of 1 meter to direct contact with the roots or rhizomes.

7. The method of claim 1, wherein the vegetative portion of the plant is in an atmosphere in the temperature range between 25° C. and 40° C.

8. The method of claim 1, wherein the growing medium is a soil substrate.

9. The method of claim 8, wherein the plant is grown in a region where it is not indigenous.

10. A method of regulating plant growth, comprising:
selecting a root or rhizome containing plant;
where the root or rhizome is planted a growing medium, wherein the growing medium has a surface accessible to air;
placing a source of deep ocean water in the growing medium;
wherein the source of deep ocean water is placed at a predetermined distance from the roots or rhizomes below the surface of the growing medium; and
creating a temperature gradient between the surface of the growing medium and the source of deep ocean water comprising lowering the temperature of the growing medium at the source of deep ocean water.

11. The method of claim 10, wherein the root or rhizome containing plant is a vascular plant.

12. The method of claim 10, wherein the placement at a predetermined distance is within a range of 1 meter to direct contact with the roots or rhizomes.

13. The method of claim 10, wherein the source of deep ocean water provides a temperature lower than the dew point of the air accessible to the growing medium surface.

14. The method of claim 10, wherein the roots or rhizomes of the plant grow towards the coldest area of the temperature gradient.

15. The method of claim 10, further comprising: condensing moisture at the surface of the growing medium, wherein the condensed moisture travels from the surface of the growing medium to the source of deep ocean water.

16. The method of claim 10 wherein the plant is grown in a region where the plant is not indigenous.

* * * * *